US012316525B2

(12) United States Patent
Ashino et al.

(10) Patent No.: US 12,316,525 B2
(45) Date of Patent: May 27, 2025

(54) INFORMATION PROCESSING DEVICE, INFORMATION PROCESSING METHOD, AND STORAGE MEDIUM

(71) Applicant: NEC Corporation, Tokyo (JP)

(72) Inventors: Yuki Ashino, Tokyo (JP); Takashi Hitani, Tokyo (JP); Miyu Yakumaru, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/370,946

(22) Filed: Sep. 21, 2023

(65) Prior Publication Data

US 2024/0113957 A1 Apr. 4, 2024

(30) Foreign Application Priority Data

Sep. 30, 2022 (JP) .................................. 2022-157751

(51) Int. Cl.
*G06F 7/00* (2006.01)
*G01B 7/14* (2006.01)
*H04L 29/08* (2006.01)
*H04L 45/02* (2022.01)
*H04L 67/52* (2022.01)

(52) U.S. Cl.
CPC .............. *H04L 45/02* (2013.01); *H04L 67/52* (2022.05)

(58) Field of Classification Search
CPC ................................ H04L 45/02; H04L 67/52
See application file for complete search history.

(56) References Cited

U.S. PATENT DOCUMENTS

| 6,316,934 B1 * | 11/2001 | Amorai-Moriya | G01B 7/004 324/207.17 |
| 9,171,079 B2 * | 10/2015 | Banka | G06F 16/953 |
| 9,557,182 B2 * | 1/2017 | Nesbitt | G01C 21/34 |
| 10,825,035 B2 * | 11/2020 | Yamato | G06Q 50/40 |
| 2002/0186665 A1 * | 12/2002 | Chaffee | H04L 45/00 370/255 |
| 2013/0165122 A1 * | 6/2013 | Tanaka | H04W 36/00692 455/436 |
| 2021/0011171 A1 * | 1/2021 | Miyamoto | G01S 19/22 |
| 2024/0240950 A1 * | 7/2024 | Otaki | G01C 21/3617 |

FOREIGN PATENT DOCUMENTS

JP 2007-329581 A 12/2007
KR 102160920 B1 * 9/2020

\* cited by examiner

*Primary Examiner* — Jason D Recek
*Assistant Examiner* — Golam Mahmud

(57) ABSTRACT

An information processing device acquires a first position indicating a physical position of a first communication device, a second position indicating a physical position of a second communication device, and a plurality of third positions indicating physical positions set in a path connecting the first position and the second position; and searches for a physical path corresponding to a communication path of the first communication device and the second communication device based on the first position, the second position, and the plurality of third positions.

14 Claims, 10 Drawing Sheets

INFORMATION PROCESSING DEVICE, INFORMATION PROCESSING METHOD, AND STORAGE MEDIUM

This application is based upon and claims the benefit of priority from Japanese patent application No. 2022-157751, filed on Sep. 30, 2022, the disclosure of which is incorporated herein in its entirety by reference.

TECHNICAL FIELD

The present disclosure relates to an information processing device, an information processing method, and a storage medium.

BACKGROUND ART

It is necessary to identify the position of a target communication device when, for example, maintenance of the communication device is to be performed. As a related technique, Japanese Unexamined Patent Application Publication No. 2007-329581 discloses a technique for determining the physical position of a communication device whose physical position is unknown.

SUMMARY

Here, in communications between two points connected by a communication network, there is a demand for technology that can estimate the physical path corresponding to the communication path traversed by the communication.

It is therefore an example object of the present disclosure to provide an information processing device, an information processing method, and a storage medium that solves the aforementioned problem.

According to the first example aspect of the disclosure, an information processing device is provided with an acquisition means that acquires a first position indicating a physical position of a first communication device, a second position indicating a physical position of a second communication device, and a plurality of third positions indicating physical positions set in a path connecting the first position and the second position; and a search means that searches for a physical path corresponding to a communication path of the first communication device and the second communication device based on the first position, the second position, and the plurality of third positions.

According to the second example aspect of the disclosure, an information processing method acquires a first position indicating a physical position of a first communication device, a second position indicating a physical position of a second communication device, and a plurality of third positions indicating physical positions set in a path connecting the first position and the second position; and searches for a physical path corresponding to a communication path of the first communication device and the second communication device based on the first position, the second position, and the plurality of third positions.

According to a third example aspect of the disclosure, a non-transitory computer-readable storage medium storing a program causes a computer of an information processing device to function as an acquisition means that acquires a first position indicating a physical position of a first communication device, a second position indicating a physical position of a second communication device, and third positions indicating a plurality of physical positions set in a path connecting the first position and the second position; and a search means that searches for a physical path corresponding to a communication path of the first communication device and the second communication device based on the first position, the second position, and the plurality of third positions.

Effects of Disclosure

According to the present disclosure the physical positions through which communication passes can actually be estimated.

EXAMPLE EMBODIMENT

First Example Embodiment

The following is a description of a communication network according to the first example embodiment of the disclosure with reference to the drawings.

Figure 1:
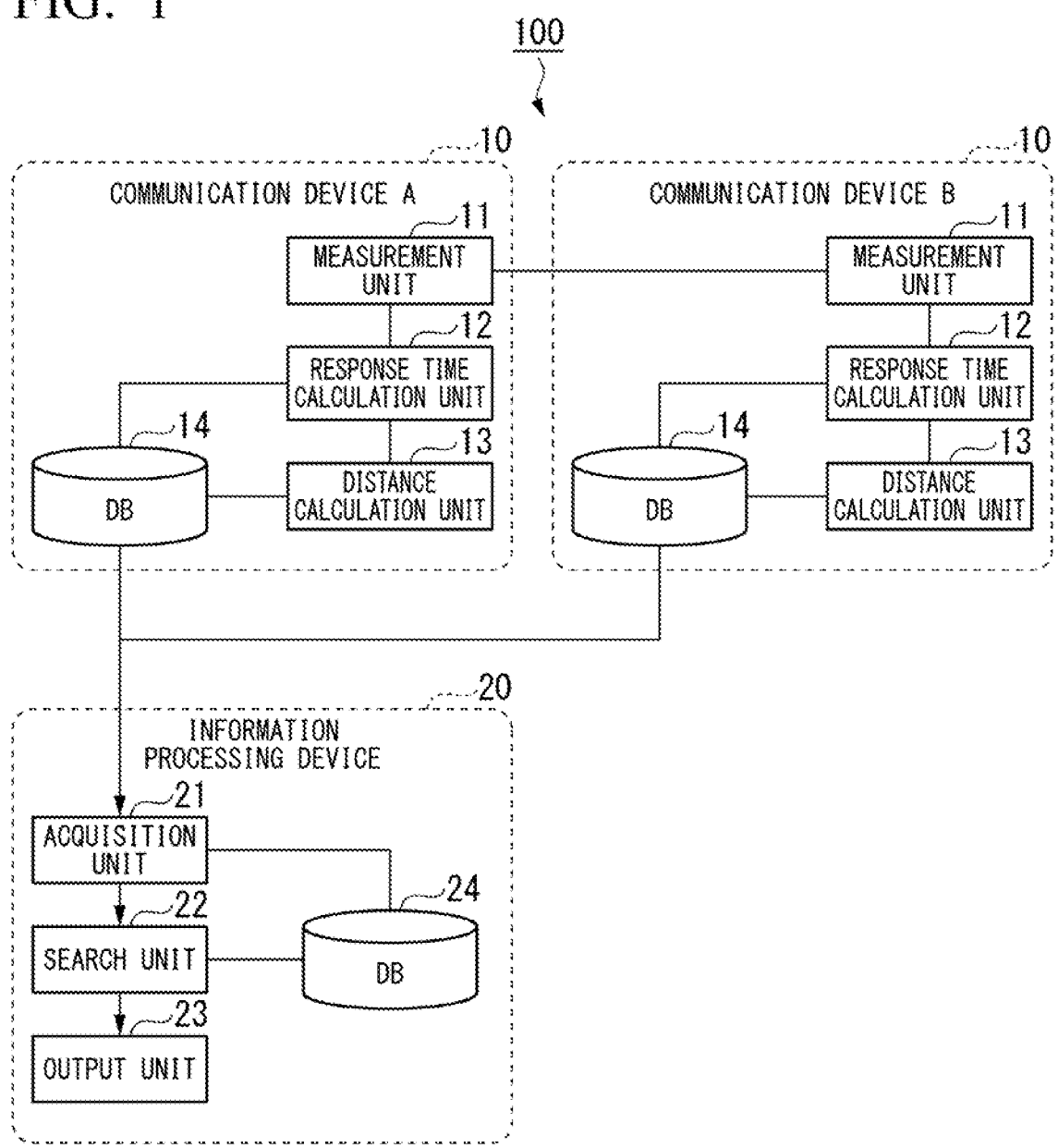
FIG. 1 is a diagram that shows a communication network provided with an information processing device and a plurality of communication devices according to the present example embodiment.

FIG. 1 shows a communication network 100 with an information processing device and a plurality of communication devices according to the present example embodiment. In the communication network 100 shown in FIG. 1, two communication devices 10, namely, communication device A and communication device B, and an information processing device 20 are connected via a communication network. More specifically, the communication device A, communication device B, and information processing device 20 each have a communication connection. The communication device A and the communication device B shall be collectively referred to as communication devices 10. The communication device A is an example of a first communication device. The communication device B is an example of a second communication device. Other communication devices 10 besides the communication device A and the communication device B may be further connected to the communication network 100. The communication devices 10, such as the communication device A and the communication device B, are connected via communication paths established in roads, deserts, undersea, terrestrial space, outer space, and the like. Note that in the following example, the case shall be described in which the communication devices A and B are connected by a communication path consisting of communication cables laid in an underground cable conduit or the like along a road. A relay device that relays the communications is connected to the communication path, and this relay device may be defined as the communication device 10.

The communication devices A and B are each equipped with the functions of a measurement unit 11, a response time calculation unit 12, a distance calculation unit 13, and a DB (database) 14. The measurement unit 11 transmits communication packets to other communication devices 10 to calculate the response time (RTT), receives communication packets in response, and identifies the time of transmission and the time of reception of those communication packets. More specifically, the measurement unit 11 transmits a survey packet P to the survey target and receives a response packet R from the survey target. The measurement unit 11 acquires the transmission time Tp at which the survey packet P was transmitted and the reception time Tr at which the response packet R was received.

The response time calculation unit 12 calculates the response time RTT using the transmission time Tp and reception time Tr.

The distance calculation unit 13 calculates the communication distance (communication path distance) corresponding to the communication path with the other communication device 10 that is communicatively connected. Specifically, the distance calculation unit 13 acquires from the DB 14 the medium velocity Vm, which is the signal transmission speed of the transmission medium between the communication devices 10. It is assumed that the transmission medium between the communication device A and the communication device B is known. The distance calculation unit 13 calculates the communication distance using the response time RTT and the medium velocity Vm.

The DB 14 stores the medium velocity Vm of communication according to the transmission medium used in the communication path and the communication distance calculated for the communication path.

The communication device A calculates the communication distance corresponding to the communication path between itself and the communication device B. The communication device B may also calculate the communication distance corresponding to the communication path between itself and the communication device A. The communication device A or the communication device B outputs the calculated communication distance to the information processing device 20. The communication device A or the communication device B may transmit the response time RTT to the information processing device 20, and the information processing device 20 may calculate the communication distance corresponding to the communication path between the communication device A and the communication device B based on the response time. The transmission medium used for the communication path is, for example, optical fiber, metal, and the like. The communication device A and the communication device B may be any two communication devices 10 connected to the communication network 100.

The information processing device 20 performs the functions of an acquisition unit 21, a search unit 22, an output unit 23, and a DB 24 by executing a predetermined program.

The acquisition unit 21 identifies the communication device 10 at the start of the communication path (e.g., communication device A) and the communication device 10 at the end of the communication path (e.g., communication device B) when the physical path corresponding to a communication path is the target of the search, and acquires from those communication devices 10 the measurement information, or the response time of that communication path, or information of the communication distance of that communication path. The acquisition unit 21 also acquires position information indicating the physical position of each of the communication devices 10 at the identified start and end points and a plurality of physical positions set in the physical path in a range determined according to those physical positions.

The search unit 22 uses the information acquired by the acquisition unit 21 to search for a physical path corresponding to the communication path between the communication devices 10 at the identified start and end points.

The output unit 23 outputs information on the physical path corresponding to the communication path between the communication devices 10 at the identified start and end points.

The DB 24 stores the information acquired from the communication devices 10 by the acquisition unit 21. The DB 24 also stores the physical position set for a predetermined physical path.

Figure 2:
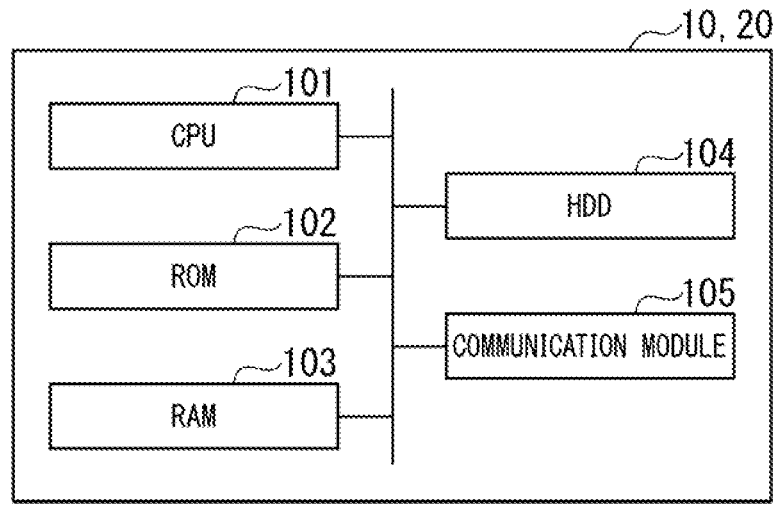
FIG. 2 is a diagram that shows an example of the hardware configuration of the communication device and the information processing device according to the present example embodiment.

FIG. 2 shows an example of the hardware configuration of the communication device and the information processing device.

As FIG. 2 shows, the communication device 10 and the information processing device 20 are, for example, computers equipped with hardware such as a CPU (Central Processing Unit) 101, ROM (Read Only Memory) 102, RAM (Random Access Memory) 103, HDD (Hard Disk Drive) 104, and communication module 105.

Next, the processing of each of the communication devices 10 will be described.

Figure 3:
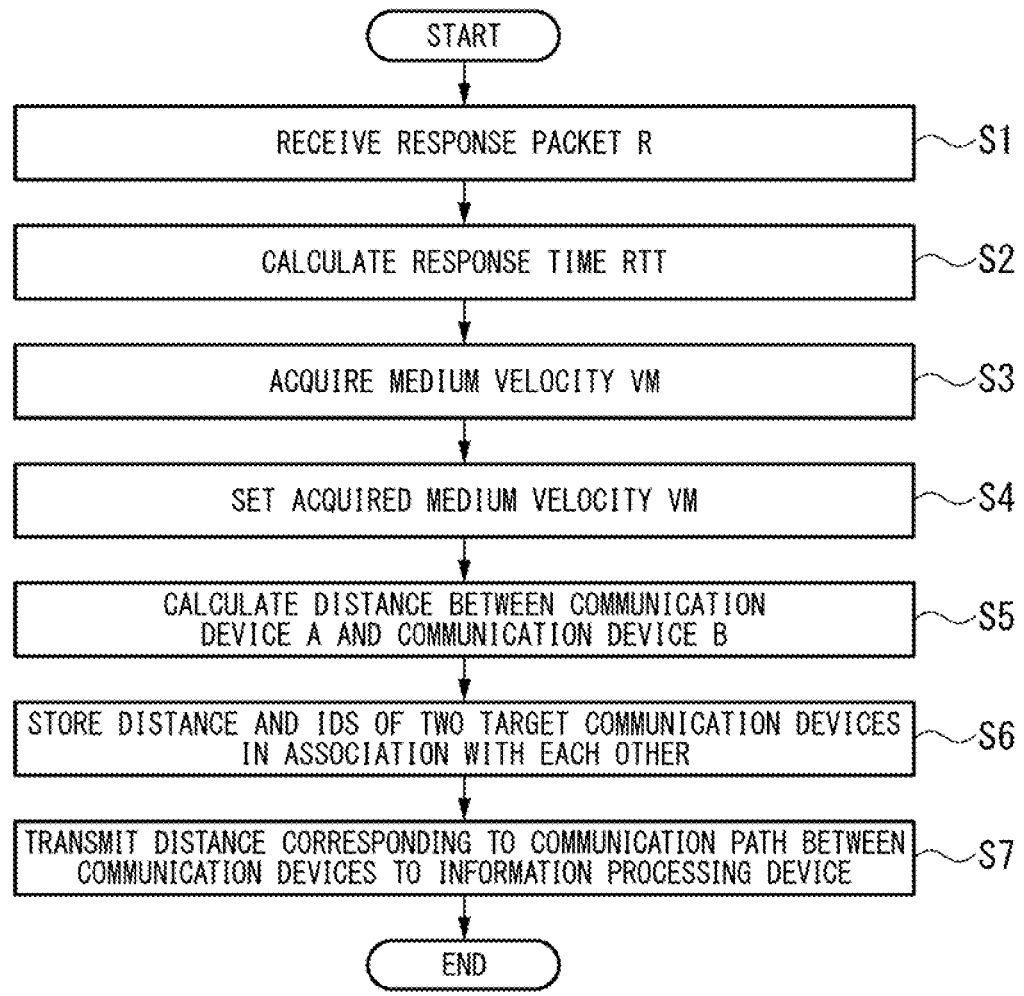
FIG. 3 is a flowchart of the processing procedure of the communication device according to the first example embodiment.

FIG. 3 is a flowchart of the processing procedures of the communication devices 10.

The measurement unit 11 of the communication device A among the communication devices 10 transmits a survey packet P to the communication device B and receives a response packet R from the communication device B (Step S1). The measurement unit 11 of the communication device A obtains the transmission time Tp at which the survey packet P was transmitted and the reception time Tr at which the response packet R was received. The response time calculation unit 12 of the communication device A calculates the response time RTT using the transmission time Tp, the reception time Tr and Equation (1) (Step S2).

$$\text{Response time } RTT = \text{Reception time } Tr - \text{Transmission time } Tp \tag{1}$$

The distance calculation unit 13 of the communication device A acquires the medium velocity Vm of the transmission medium between the communication device A and the communication device B from the DB 14 (Step S3). The distance calculation unit 13 of the communication device A is set to the acquired medium velocity Vm (Step S4). The distance calculation unit 13 calculates the distance between the communication device A and the communication device B using Equation (2) (Step S5).

$$\text{Distance} = (\text{medium velocity } Vm \times \text{response time } RTT) \div 2 \qquad (2)$$

The distance calculation unit 13 of the communication device A associates the calculated distance and the IDs of the two target communication devices 10 for which the distance was calculated and stores them in the DB 14 (Step S6). In other words, the distance calculation unit 13 of the communication device A associates the ID of communication device A, the ID of communication device B, and the distance between those communication devices 10 and stores them in the DB 14. The communication device A transmits the calculation result including the IDs of the communication devices 10 stored in the DB 14 and the distance (communication distance) corresponding to the communication path between those communication devices 10 to the information processing device 20 (Step S7). Other communication devices 10 such as the communication device B may perform the same process.

Next, the processing of the information processing device 20 will be described.

Figure 4:
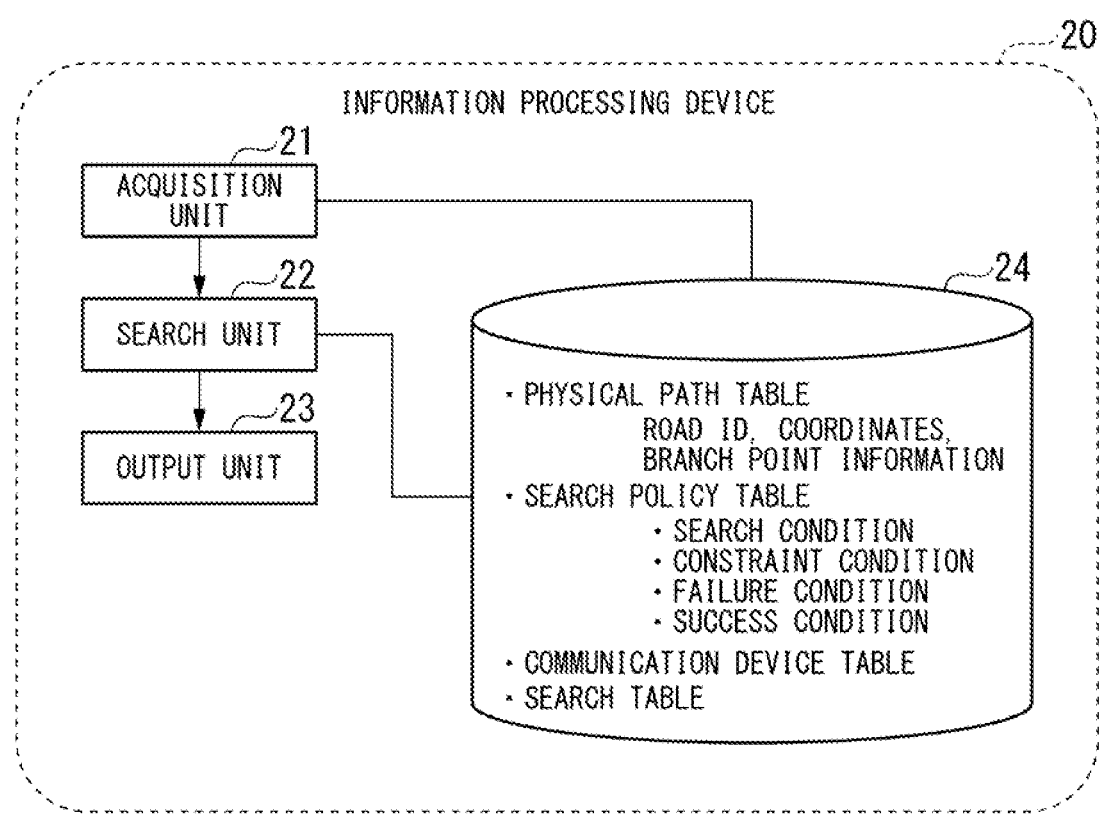
FIG. 4 is a diagram that illustrates the data table included in the database of the information processing device according to the first example embodiment.

FIG. 4 illustrates the data tables contained in the DB 24 of the information processing device 20. The DB 24 contains data tables such as physical path table, search policy table, communication device table, and search table.

The physical path table records information such as the type of physical path, the ID of the physical path, and one or more coordinates set on the road indicated by the ID. The type of physical path indicates road, submarine cable, wireless communication space, and the like. The ID of the physical path is the identifier of the physical path in question. If the physical path is a road, the ID of the physical path is assigned according to the name identifying the road and the location of curves. The coordinate information may be coordinates indicating the latitude and longitude of the earth's surface, or coordinates in another coordinate system having the center of the earth as the origin, etc. If the physical path is a road, the coordinate information consists of, for example, multiple coordinates representing different positions on that curve, for example, those set on the curve. If the physical path is a wireless communication space, the coordinate information may be the coordinates of a wireless communication device (e.g., communication base station or satellite) or multiple 3D coordinates in a space set at predetermined intervals between wireless communication devices.

The branch point information is information indicating whether the coordinates are located at a branch point of a physical path. For example, when roads diverge, there is a first road that passes through the branch point and a second road that starts at the branch point. In this case, the coordinates of the branch point are recorded in a physical path table linked to the road ID of the first road as the coordinates of the first road, and the coordinates of the branch point are also recorded in the physical path table linked to the road ID of the second road as the coordinates of the second road. The coordinates of the branch point are recorded in the physical path table, linked to a flag or other information indicating that the information is about the branch point.

The search policy table records the conditions used by the search unit 22 in the search process for physical paths corresponding to communication paths. The conditions are search, constraint, failure, and success conditions. A search condition is, for example, a condition that limits the road type. As an example, the search condition indicates a road type that corresponds to a major road with a road width of at least a predetermined width. A search condition may indicate other road types or other types of physical paths (e.g., undersea cables, wireless communication space, etc.).

The constraint condition is a condition that constrains the scope of the search for a physical path corresponding to the communication path. An example is the radius of a circle (e.g., 5 km) from the start and end points of the communication path. The information processing device 20 performs a search process using these two circles and the range of two tangent lines common to the circle radii as the search range.

The failure condition is a condition for determining a search to be a failure based on the positional relationship between the position on the physical path identified by the information processing device 20 in a sequential manner in the search process and the communication device 10 at the end point. The failure condition in this example embodiment indicates the minimum value of the difference obtained by subtracting the physical distance (physical path distance) based on the start point to the final position on the physical path identified by the information processing device 20 in a sequential manner in the search process from the communication distance between the start point and the end point calculated in advance before the search process, and in this example embodiment the minimum value of the failure condition indicates 0. The information processing device 20 determines that a failure has occurred when the difference between the physical distance based on the start point to the final position on the physical path identified in a sequential manner by the information processing device 20 in the search process and the communication distance between the start point and the end point calculated in advance before the search process is less than 0 (a negative value), which is the minimum value.

The success condition is a condition for determining that a search to be successful based on the positional relationship between the position on the physical path identified by the information processing device 20 in a sequential manner in the search process and the communication device 10 at the end point. The first success condition in the present example embodiment indicates a ratio with respect to the communication distance of the difference between the communication distance of the communication devices 10 at the start and end points of the communication path corresponding to the physical path subject to the search process and the physical distance from the start point to the position on the physical path identified in sequence by the information processing device 20 in the search process. In the present example embodiment, the percentage indicated by the first success condition represents 1%. The second success condition in the present example embodiment indicates the distance between a position on the physical path identified by the information processing device 20 in a sequential manner in the search process and the position of the communication device at the end point. The distance indicated by the second success condition in this example embodiment is 1 km. Using the first success condition and the second success condition, the information processing device 20 determines the search process to be a success if the ratio of the difference between the communication distance and the physical distance to the communication distance is within 1%, the distance between the position on the identified physical path and the position of the end-point communication device is within 1 km, and the failure condition is not met.

The communication device table associates and records the physical positions of the multiple communication devices 10 that comprise the communication network 100 and the information acquired by the information processing device 20 from those communication devices 10, linked to the IDs of the communication devices 10. The information obtained by the information processing device 20 from the communication devices 10 may be information calculated and measured by the communication devices 10. For example, it is information such as transmission time, reception time, response time, and communication distance measured in communication with other communication devices 10. The search table stores the information that is temporarily stored in the search process of the search unit 22.

Figure 5:
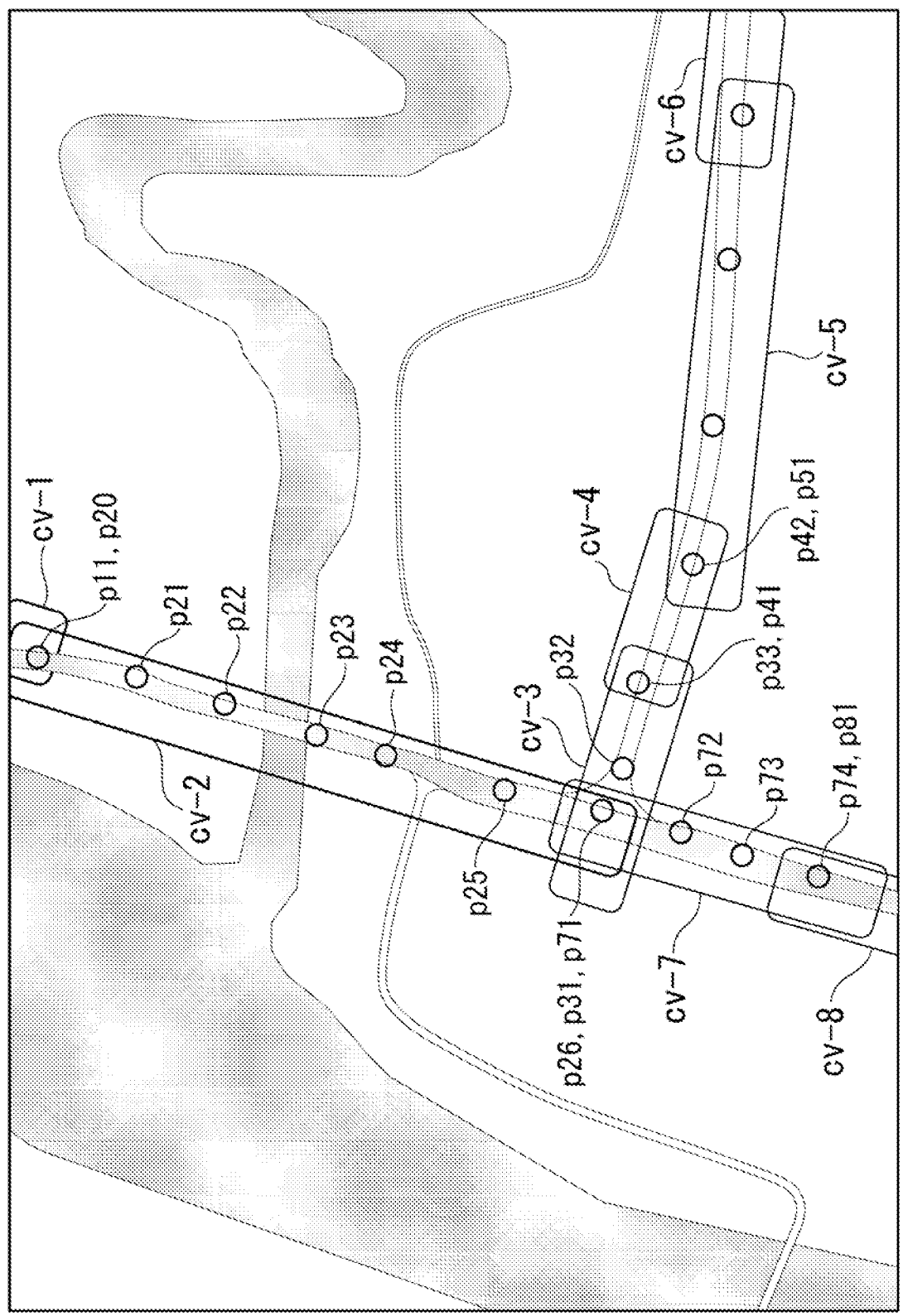
FIG. 5 is a diagram that illustrates the information recorded in the physical path table according to the first example embodiment.

FIG. 5 illustrates the information recorded in the physical path table.

FIG. 5 shows the IDs of roads on a map and multiple physical positions set on the roads indicated by those IDs. Each road on the map displayed in FIG. 5 is divided into road ranges indicated by respective road IDs such as cv-1, cv-2, cv-3, cv-4, cv-5, cv-6, cv-7, cv-8, etc. The road range indicated by each road ID has multiple physical positions, for example, the road range indicated by cv-2 has seven positions from p20 to p26. Similarly, four positions from p71 to p74 are set in the road range indicated by cv-7. Similarly, three positions from p31 to p33 are set in the road range indicated by cv-4. These physical positions are the actual measured or calculated coordinate values. Explanations for other road IDs are omitted.

As an example, the physical position p20 in the road range cv-2 corresponds to the physical position p11 in the road range cv-1. In this way, the two end positions in a road range indicated by a road ID may correspond to the end positions of other roads, and in this case, the same position information is recorded in the physical path table linked to the road ID indicating each road range. The physical position of information linked to road IDs indicated by multiple road ranges is referred to as a branch point. The physical path table shall have flag values indicating whether each physical position is a branch point or not recorded in advance in association with the road ID.

Figure 6:
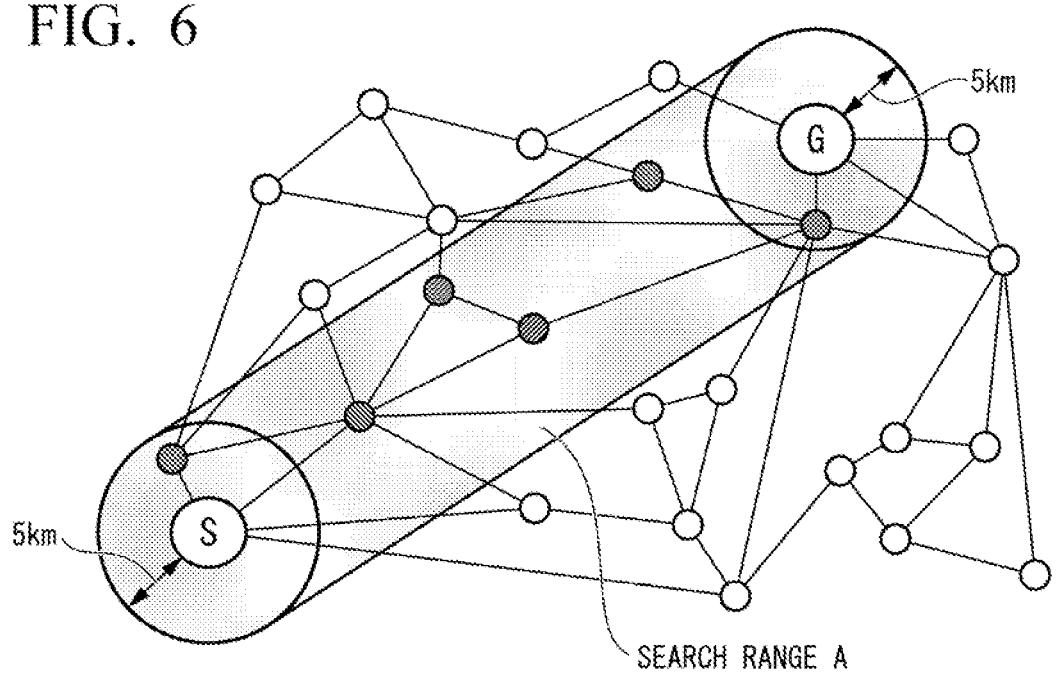
FIG. 6 is a diagram that illustrates the search range according to the first example embodiment.

FIG. 6 illustrates a search range.

When the physical path corresponding to the communication path is made the target of a search, the communication device 10 at the start of the communication path is indicated by "S" in FIG. 6 and the communication device 10 at the end of the communication path is indicated by "G" in FIG. 6. As an example, the information processing device 20 identifies as a search range A the range bounded by the first circle with a radius of 5 km for the communication device S, the second circle with a radius of 5 km for the communication device G, and two straight lines commonly tangent to the first circle and the second circle, which have been set based on constraint conditions.

Figure 7:
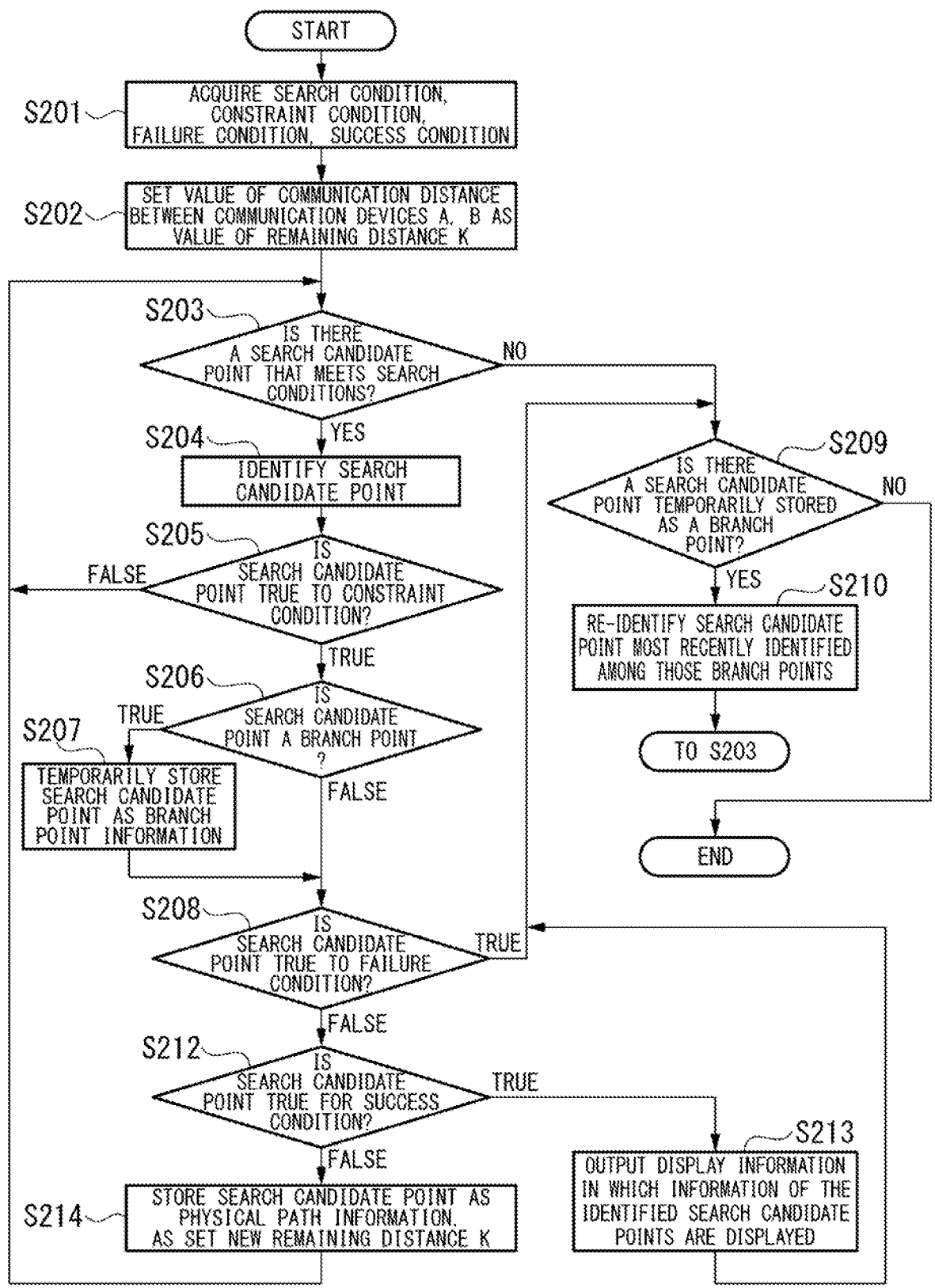
FIG. 7 is a flowchart of the processing procedure of the information processing device according to the first example embodiment.

FIG. 7 is a flowchart of the processing procedure of the information processing device 20.

The following is a step-by-step explanation of the process of the information processing device 20.

The acquisition unit 21 of the information processing device 20 records the communication distance with the other party's communication device 10 acquired from the communication device 10 in the communication device table, being associated with the ID of the communication device 10 from which the communication distance was transmitted. The acquisition unit 21 also records other information acquired from the communication device 10 in the communication device table by linking it to the ID of that communication device 10. As an example, the acquisition unit 21 acquires the communication distance calculated based on communication between the communication device A and the communication device B, the transmission time Tp and reception time Tr when the communication device A communicated with the communication device B, and the response time RTT calculated based on those times and the medium velocity Vm, and records them in the communication device table in association with the ID of the communication device A.

The acquisition unit 21 also acquires the start signal of the search process from the user. In this start signal is included information on the communication device A and communication device B, which are the respective start and end points of the corresponding communication path for searching for the physical path. After acquiring the start signal, the acquisition unit 21 outputs the information on the communication device A and the communication device B, which are the respective start and end points of the communication path, to the search unit 22 and instructs it to start the process.

If the search unit 22 is unable to acquire the communication distance between the communication device A and the communication device B, which are the start and end points of the corresponding communication path for searching for the physical path, or the response time in communication therebetween, it may calculate the communication distance using the transmission time Tp, reception time Tr and medium velocity Vm when the communication device A communicated with the communication device B. In other words, the search unit 22 may be provided with the processing functions of the response time calculation unit 12 and the distance calculation unit 13 of the communication device 10.

The search unit 22, upon receiving an instruction to start the process, acquires the physical positions of the communication device A and the communication device B from the communication device table in the DB 24. The search unit 22 acquires the search condition, constraint condition, failure condition, and success condition (Step S201). The search unit 22 sets the value of the communication distance between the communication device A and the communication device B as the value of the remaining distance k of the initial search, which indicates the difference obtained by subtracting the searched physical path from the communication distance between the communication devices A and B (Step S202).

The search unit 22 sets the physical position of the communication device A, which is the start point S of the communication path, as the first search candidate point, and determines whether the next search candidate point, which is the closest physical position to the set search candidate point among the physical positions yet to be identified in this search process and are associated with the type of physical path indicated by the search condition, is in the physical path table of the DB 24 (Step S203). If there are no search candidate points that meet the conditions of the process of Step S203, the search unit 22 proceeds to the process of Step S209. If there is a search candidate point that meets the conditions of the process of Step S203, the search unit 22 identifies that search candidate point (Step S204).

When the search unit 22 identifies a search candidate point, it determines whether the search candidate point is true to the constraint condition (Step S205). In other words, the search unit 22 determines whether the coordinates of the physical position of the search candidate point are included within the search range, which is bounded by the first circle with a radius of 5 km centered on the physical position of the communication device A and the second circle with a radius of 5 km centered on the physical position of the communication device B based on the 5 km radius value indicated by the constraint condition, and the two lines commonly tangent to the first circle and second circle.

If the search candidate point is true for the constraint condition, the search unit 22 determines whether the search candidate point is a branch point (Step S206). If a flag indicating a branch point is associated with the physical position of the search candidate point and recorded in the physical path table, the search candidate point can be determined to be a branch point. If the search candidate point is a branch point, the search unit 22 temporarily stores the search candidate point as branch point information (Step S207). By temporarily storing the search candidate point as branch point information, other physical paths can be searched later using the search candidate point of the branch point as a basis.

If the search candidate point is not a branch point, and if it is registered as branch point information, the search unit 22 then determines whether the search candidate point is true for the failure condition (Step S208). In other words, the search unit 22 determines whether the value obtained by subtracting the physical distance from the start point S to the search candidate point from the communication distance from the start point S (communication device A) to the end point G (communication device B) is less than 0. The failure condition is true if the value obtained by subtracting the physical distance from the start point S to the search candidate point from the communication distance from the start point S (communication device A) to the end point G (communication device B) is less than 0. When the value obtained by subtracting the physical distance from the start point S to the search candidate point from the communication distance from the start point S (communication device A) to the end point G (communication device B) is less than 0, it means that the physical distance exceeds the communication distance. If the physical distance exceeds the communication distance, it is considered a failure. When the value obtained by subtracting the physical distance from the start point S to the search candidate point from the communication distance from the start point S (communication device A) to the end point G (communication device B) is equal to or greater than 0, it means that the physical distance does not exceed the communication distance.

When the value obtained by subtracting the physical distance from the start point S to the search candidate point from the communication distance from the start point S (communication device A) to the end point G (communication device B) is less than 0, and thus the search candidate point is determined to be true under the failure condition, the search unit 22 determines whether there is a search candidate point temporarily stored as a branch point among the search candidate points identified before this search candidate point (Step S209). The search unit 22 ends the search process if there is no search candidate point temporarily stored as a branch point among the previously identified search candidate points.

If any of the previously identified search candidate points have been temporarily stored as branch points, the search unit 22 re-identifies the most recently identified search candidate point among those branch points (Step S210). The search unit 22 sets the difference obtained by subtracting the physical distance from the start point S to the re-identified search candidate point from the communication distance between the communication device A that is the start point S and the communication device B that is the end point G as the new remaining distance k for the search. The search unit 22 returns to Step S203 in order to start the search process for another physical path that has not undergone a new search process based on the re-identified search candidate point, and identifies the physical position closest to the re-identified search candidate point and not yet identified in this search process as the next search candidate point. The process is then repeated from Step S204.

If the search candidate point can be determined to be false for the failure condition, the search unit 22 determines whether the search candidate point is true for the success condition based on the relationship between the physical position of the search candidate point and the physical position of the communication device B at the end point G (Step S212). Specifically, if the difference between the communication distance from the start point S to the end point G and the physical distance from the start point S to the search candidate point identified at this time is within 1% of the communication distance, and the distance between the physical position of the search candidate point and the physical position of the communication device B at the end point G is within 1 km, the search unit 22 can determine that the search candidate point is true to the success information. If a search candidate point is true for the success information, the output unit 23 outputs the information of the physical path including each search candidate point identified up to that search candidate point (road ID, coordinates, etc.) and display information of those search candidate points plotted and displayed on a map to a predetermined output destination (Step S213).

The search unit 22 returns to Step S209 to determine if there are any other search paths and to determine if there are any branch points.

If a search candidate point is false for success information, the search unit 22 stores the search candidate point as information on the physical path. The search unit 22 subtracts the physical distance through each search candidate point stored as information on the physical path from the communication distance between the communication device A, which is the start point S, and the communication device B, which is the end point G, and sets that value as the new remaining distance k (Step S214). Then, the search unit 22 repeats the process from Step S203, using the last search candidate point stored as information on the physical path as the base point.

By repeating the above process from Step S203 to Step S214, it is possible to estimate the physical path corresponding to the communication path between the communication devices 10 from the start point S to the end point G, by identifying search candidate points from the communication device A at the start point S to the near the end point G, being search points that can be identified in the search range based on the constraint condition, in which the physical distance is shorter than the communication distance.

The processing of the information processing device 20 described above is an example of processing that acquires a first position indicating the physical position of the first communication device, a second position indicating the physical position of the second communication device, and third positions indicating a plurality of physical positions set in the path connecting the first and second positions, and based on the first position, second position, and plurality of third positions, searches for a physical path corresponding to the communication path between the first communication device and the second communication device.

The processing of the information processing device 20 described above also sequentially searches for a plurality of third positions (search candidate points) in the search range with the first position described above as a reference, and calculates the remaining distance by using the physical path distance, which is the sum of the linear distances between each position from the first position to the last searched third position via the plurality of third positions already searched, and the communication path distance, which is calculated based on the communication response time between the first communication device and the second communication device and the medium velocity of that communication path. The aforementioned process of the information processing device 20 is one example of a process of repeating a process of re-searching for the third position (search candidate point) based on the third position indicating the last searched branch point among the third positions, when the remaining distance becomes less than the value of the failure condition indicating the minimum value of the remaining distance, which indicates that the physical path distance is longer than the communication path distance.

Figures 8, 9:
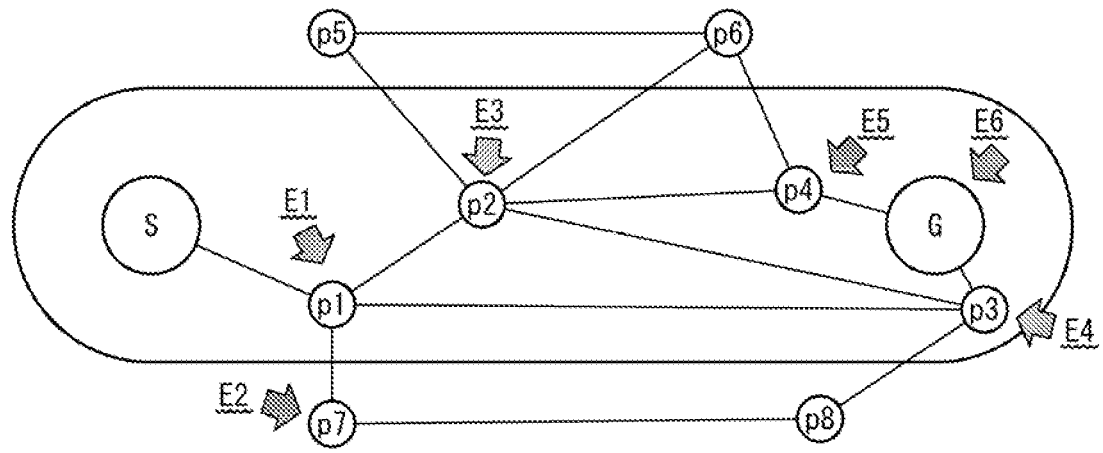
FIG. 8 is a first diagram that shows an overview of the search process according to the first example embodiment.
FIG. 9 is a second diagram that shows an overview of the search process according to the first example embodiment.

FIG. 8 is a first diagram showing an overview of the search process.

FIG. 9 is a second diagram showing an overview of the search process.

The process of the search unit 22 of the information processing device 20 described above shall be explained using FIGS. 8 and 9.

The search unit 22 performs a search process E1 based on the start point S among the plurality of physical positions between the start point S and the end point G. In this search process E1, the search unit 22 identifies as a search candidate point the physical position p1, which is the physical position closest to the start point S that is also true for the search condition, true for the constraint condition, and for which the failure and success conditions are false. As shown in E1 of FIG. 9, the search unit 22 records in the search table the start point S, the search candidate point p1, and the remaining distance k at the search candidate point p1 in a manner associated with each other. The search unit 22 records p1, which is the next candidate point after the start point S, in the search table as information on the first branch point, as shown in E1 of FIG. 9. The information on such branch points is used in the process in Step S209 above.

The search unit 22 similarly performs the search process E2 based on the search candidate point p1, and if the physical position p7, which is and true for the search condition and closest to the search candidate point p1 among the physical positions not selected in the past, is false for the constraint condition, the search unit 22 excludes the search candidate point p7 from the physical path information, returns to the search candidate point p1, which is the branch point, and performs the search process E3 based on the search candidate point p1. In other words, as shown in E2 of FIG. 9, the search unit 22 performs the next search process E3 without recording information associating the search candidate point p1 serving as a basis, the next search candidate point p7, and the remaining distance k at the search candidate point p7 in the search table.

In similarly performing the search process E3 based on the search candidate point p1, when the physical position p2, which is true for the search condition among physical positions not selected in the past and closest to the search candidate point p1, is true for the constraint condition and false for the failure and success conditions, the search unit 22 identifies that physical position p2 as the search candidate point. As shown in E3 of FIG. 9, the search unit 22 records in the search table the search candidate point p1, the search candidate point p2, and the remaining distance k at the search candidate point p2 in a manner associated with each other. The search unit 22 also records information of the search candidate point p2 as the next branch point on the physical path after the search candidate point p1, which was the previously recorded branch point in the search table, as shown in E3 of FIG. 9.

In similarly performing the search process E4 based on the search candidate point p2, when the physical position p3, which is true for the search condition among physical positions not selected in the past and closest to the search candidate point p2, is true for the constraint condition and false for the failure and success conditions, the search unit 22 identifies that physical position p3 as the search candidate point. Here, if the difference obtained by subtracting the physical distance from the start point S to the search candidate point p3 from the communication distance from the start point S to the end point G is a value smaller than 0, which is the minimum value of the failure condition, the failure condition is true, and so the search unit 22 excludes the search candidate point p3 from the physical path information, returns to the search candidate point p2 as the branch point, and performs search process E5 based on the search candidate point p2. In other words, as shown in E4 of FIG. 9, the search unit 22 performs the next search process E5 without recording information associating the search candidate point p2 serving as a basis, the next search candidate point p3, and the remaining distance k at the search candidate point p3 in the search table.

In similarly performing the search process E5 based on the search candidate point p2, when the physical position p4, which is true for the search condition among physical positions not selected in the past and closest to the search candidate point p2, is true for the constraint condition and false for the failure and success conditions, the search unit 22 identifies that physical position p4 as the search candidate point. If the difference (remaining distance k) obtained by subtracting the physical distance from the start point S to the search candidate point p4 from the communication distance from the start point S to the end point G is equal to or greater than 0 (physical distance<communication distance), the failure condition is false because the remaining distance k is a value equal to or greater than 0, which is the minimum value of the failure condition. In this case, the search unit 22 records the search candidate point p4 in the search table in a manner associating the search candidate point p2, the search candidate point p4, and the remaining distance k at the candidate point p4, as shown in E5 of FIG. 9. The search unit 22 also records the information of the search candidate point p4 as the next branch point on the physical path after the search candidate point p2, which was the previously recorded branch point in the search table, as shown in E5 of FIG. 9.

If the success condition is determined to be true for the search candidate point p4, the search unit 22 records the search candidate point p4 in the search table in a manner associated with information on the end point G, and the remaining distance k(0), as shown in E6 of FIG. 9. The order of the physical positions (S→p1→p2→p4→G) recorded in the search table is the physical path.

Figure 10:
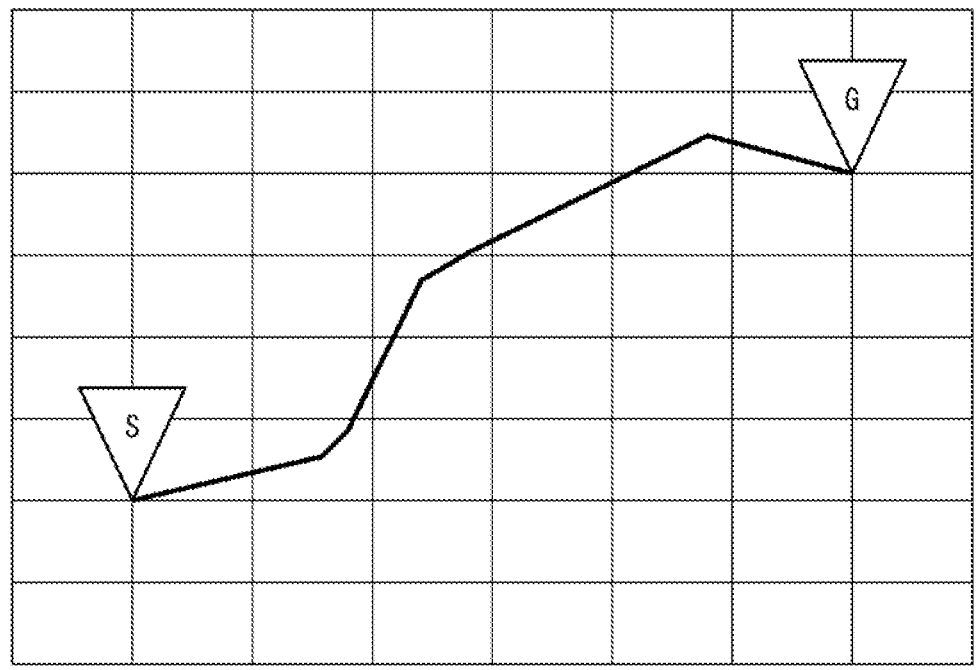
FIG. 10 is a diagram that shows an example of the output result of the output unit according to the first example embodiment.

FIG. 10 shows an example of the output results of the output unit.

As shown in FIG. 10, for example, the output unit 23 outputs in a manner superimposed on a map the physical path representing the position of the communication device that will be the start point S, the position of the communication device that will be the end point G, and the physical positions that can be estimated corresponding to the communication path between those communication devices.

If the search process described above allows the information processing device 20 to search for multiple physical paths where the final search candidate points of the physical positions satisfy the success condition, the information of those multiple physical paths may be output. Those multiple physical paths may be overlaid on a single map.

Second Example Embodiment

Next, the communication network according to the second example embodiment is described with reference to the drawings.

The second example embodiment describes an example in which the search unit 22 of the information processing device 20 is equipped with a function for estimating the position of a third communication device 10 whose position is unknown between the two communication devices 10 for which a physical path could be calculated (target range estimation function).

Figure 11:
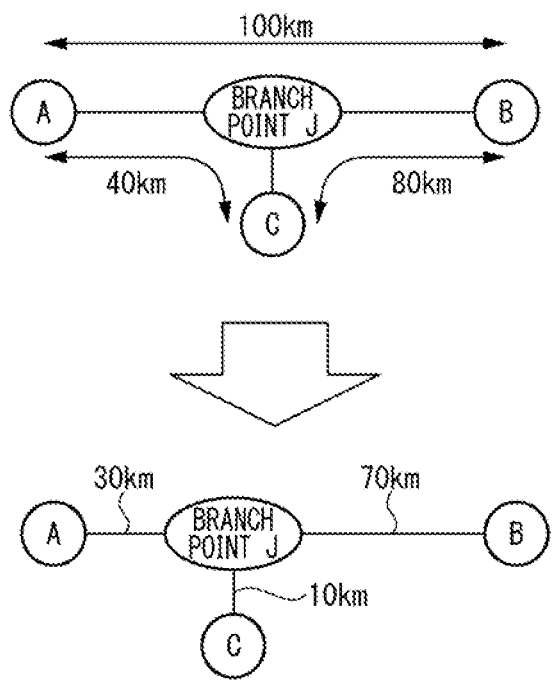
FIG. 11 is a first diagram illustrating the processing of the information processing device according to the second example embodiment.

FIG. 11 is the first diagram illustrating the processing of the information processing device according to the second example embodiment.

It is assumed that there is a possibility that a third communication device C, whose position is unknown, exists between the communication devices A and B whose physical paths have been estimated. The information processing device 20 stores the communication address of the communication device C concerned. In this case, the administrator of the information processing device 20 can instruct the information processing device 20 to search for the estimated range where the communication device C exists.

When instructing a search for the estimated range in which the communication device C exists, the administrator inputs information on communication devices A and B, which are estimated to be in the vicinity, and information on the communication device C to the information processing device 20 to instruct a search for the estimated range of the communication device C. The search unit 22 of the information processing device 20 obtains the IP address of the communication device C from the DB 24. The search unit 22 transmits a search request including the IP address of the relevant communication device C to the communication device A and communication device B.

The measurement unit 11 of the communication device A transmits a survey packet P to the communication device C and receives a response packet R from the communication device C. The measurement unit 11 of the communication device A acquires the transmission time Tp at which the survey packet P was transmitted and the reception time Tr at which the response packet R was received. The response time calculation unit 12 of the communication device A calculates the response time RTT using the transmission time Tp, the reception time Tr and the above Equation (1). The distance calculation unit 13 of the communication device A acquires the medium velocity Vm of the transmission medium between the communication device A and the communication device C from the DB 14. It is assumed that the medium velocity Vm of the transmission medium between the communication device A and the communication device C is known. The distance calculation unit 13 of the communication device A is set to the acquired medium velocity Vm. The distance calculation unit 13 calculates the communication distance AC between the communication device A and the communication device C using the above Equation (2).

Similar to the communication device A, the communication device B also calculates the communication distance BC between the communication device B and the communication device C. The communication device A transmits the communication distance AC between the communication device A and the communication device C to the information processing device 20. The communication device B transmits the communication distance BC between the communication device B and the communication device C to the information processing device 20. The communication distance AC and the communication distance BC may be calculated by the information processing device 20 as described in the first example embodiment, using the response time RTT and the medium velocity Vm measured by the communication device A and the communication device B, based on the transmission time Tp and the reception time Tr.

Now it shall be assumed that the communication or physical distance between the communication devices A and B is 100 km. Assume that the communication distance or physical distance between the communication device A and the communication device B has already been calculated by the processing of the first example embodiment or is a known given value. Then assume that the communication distance AC between the communication device A and the communication device C is 40 km, and the communication distance BC between the communication device B and the communication device C is 80 km.

The search unit 22 of the information processing device 20 estimates the position of the branch point J using the communication distance AB (or physical distance AB) between the communication device A and the communication device B, the communication distance AC of 40 km, and the communication distance BC of 80 km. Specifically, since 120 km, which is the sum of the communication distance AC and the communication distance BC, is longer than the communication distance AB of 100 km, the search unit 22 calculates half of the excess 20 km, which is 10 km, and estimates the position (J), which is obtained by subtracting the 10 km from the communication distance AC or by subtracting the 10 km from the communication distance BC, as the position of the branch point J. More specifically, the search unit 22 determines the distance from the communication device A to the branch point J using Equation (3). In other words, the distance AJ from communication device A to the branch point J can be calculated to be 30 km. In this case, from Equation (4), the distance BJ from the communication device B to the branch point J can be calculated to be 70 km.

$$AC - \{(AC+BC)-AB\} \div 2 = 30 \text{ km} \quad (3)$$

As mentioned above, since 120 km, which is the sum of the communication distance AC and the communication distance BC, is longer than the communication distance AB of 100 km, Equation (3) calculates half of the excess 20 km, which is 10 km, and calculates the position (J), which is obtained by subtracting the 10 km from the communication distance AC. Equation (3') may be used instead of Equation (3).

$$(|AC|-|BC|+|AB|) \div 2 = 30 \text{ km} \quad (3')$$

$$BJ = AB - AJ = 70 \text{ km} \quad (4)$$

Since the communication distance AC is already estimated to be 40 km, the distance from the branch point J to the communication device C to be searched can be estimated to be 10 km from Equation (5).

$$JC=AC-AJ=10 \text{ km} \quad (5)$$

Therefore, the estimated range of the communication device C can be estimated as a circular range 10 km from the branch point J. If the total distance of the communication distance AC and the communication distance BC is shorter than the communication device distance AB, the search unit 22 may output information to the destination device indicating that the calculated result of the communication distance AB between the communication device A and the communication device B may be unreliable.

Figure 12:
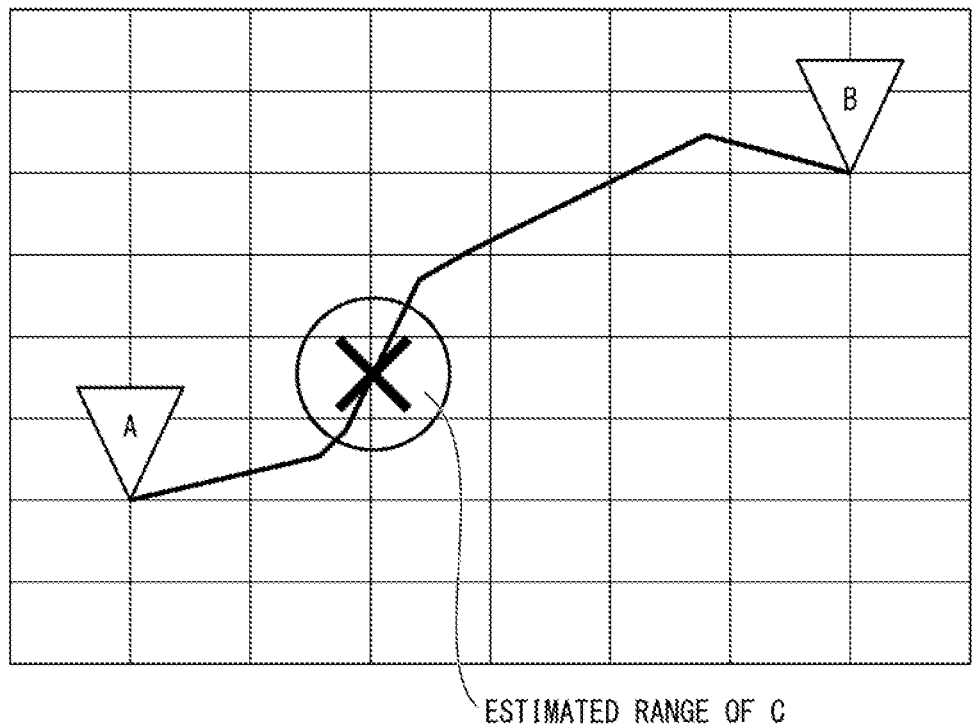
FIG. 12 is a diagram that shows an example of display information according to the second example embodiment.

FIG. 12 shows an example of the display information according to the second example embodiment.

The output unit outputs to the output destination display information in which the positions of the communication devices A and B and the physical path between the communication devices A and B estimated as in the first example embodiment are superimposed on a map, and moreover displays in a superimposed manner in that display information the branch point J at the communication distance AJ=30 km and the estimated range of the communication device C of 10 km centered on the branch point J.

The process of the third example embodiment is an example of the process by which the search unit 22 determines the estimated range of the fourth position (communication device C above), which is located in the vicinity of the physical path connecting the first position (communication device A above) and the second position (communication device B above). This case is an example of a process in which the search unit 22 performs the estimation based on the branch point (the aforementioned branch point J) in the physical path estimated based on the first estimated distance from the first position to the fourth position (the aforementioned communication distance AC), the second estimated distance from the second position to the fourth position (the aforementioned communication distance BC), the third estimated distance from the first position to the second position (the communication distance AB above), and a fourth estimated distance (the aforementioned communication distance JC) from the branch point to the fourth position (the aforementioned communication device C) estimated based on the branch point J, the first estimated distance, the second estimated distance, and the third estimated distance.

Third Example Embodiment

Figure 13:
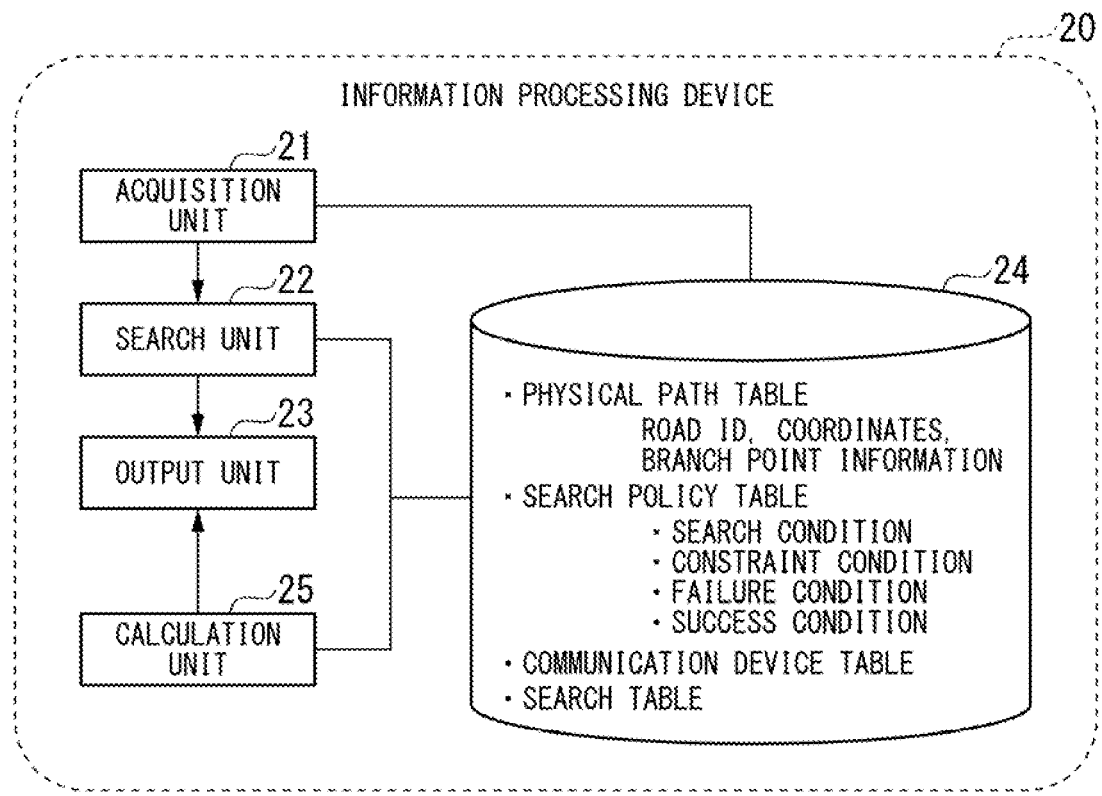
FIG. 13 is a functional block diagram of the information processing device according to the third example embodiment.

FIG. 13 is a functional block diagram of the information processing device according to the third example embodiment.

The information processing device 20 according to the third example embodiment is further provided with the function of a calculation unit 25. The calculation unit 25 calculates the medium velocity Vm of the communication cable between a predetermined set of communication devices 10, for which the physical distance corresponding to the communication path is known in advance.

For example, the information processing device 20 receives the designation of communication devices A and B and an instruction to calculate the medium velocity Vm of the communication cable between those communication devices 10. Then the calculation unit 25 acquires information on the known physical path corresponding to the communication path between the communication devices A and B calculated in the first example embodiment. The calculation unit 25 calculates the distance of the physical path based on the physical coordinates in the physical path. The calculation unit 25 also acquires the response time RTT (seconds) of the communication between the communication device A and the communication device B from the communication device table in the DB 24. The calculation unit 25 calculates the medium velocity using Equation (6). The output unit 23 may output the medium velocity information to a predetermined display device or other output destination.

$$\text{Medium velocity } Vm=\text{distance of physical path (km)} \div(\text{response time } RTT \div 2) \quad (6)$$

According to the third example embodiment, the velocity of communication using the medium of communication cables (medium velocity) can be calculated based on the physical distance between the communication devices 10.

Fourth Example Embodiment

Figure 14:
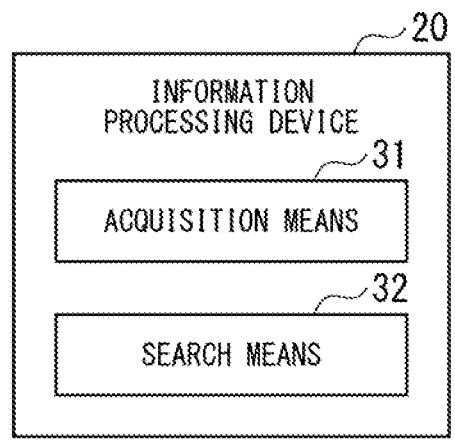
FIG. 14 is a diagram that shows another configuration of the information processing device.

FIG. 14 shows another configuration of the information processing device.

Figure 15:
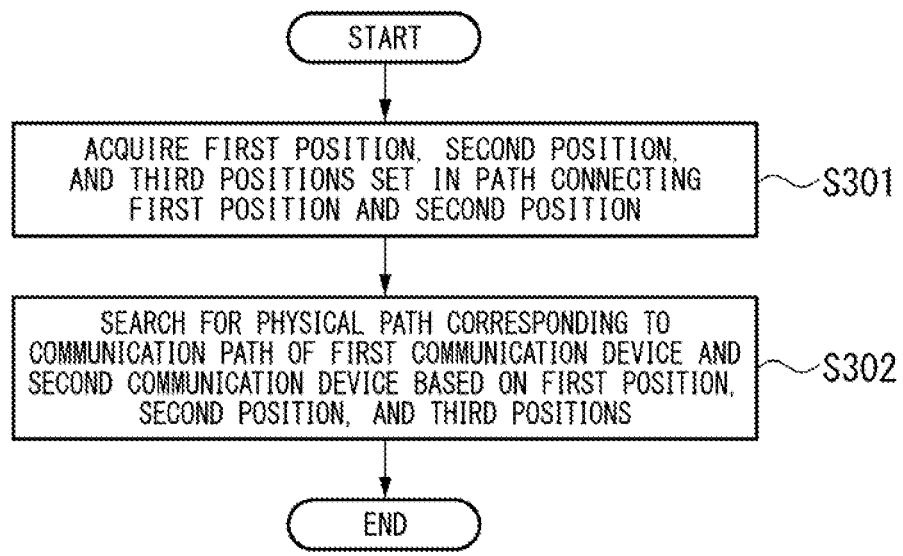
FIG. 15 is a diagram that shows the processing flow by the information processing device shown in FIG. 14.

FIG. 15 shows the processing flow by the information processing device shown in FIG. 14.

The information processing device 20 is provided with at least an acquisition means 31 and a search means 32.

The acquisition means 31 acquires a first position indicating the physical position of a first communication device, a second position indicating the physical position of a second communication device, and third positions indicating a plurality of physical positions set in a path connecting the first and second positions (Step S301).

The search means 32 searches for a physical path corresponding to the communication path of the first and second communication devices based on the first position, the second position, and the plurality of third positions (Step S302).

The communication device 10 and the information processing device 20 described above have a computer system inside. Each of the above-mentioned processes is stored in a computer-readable recording medium in the form of a program, and the computer reads and executes this program to perform the above-mentioned processes.

The above program may be intended to realize some of the aforementioned functions. Moreover, the program may be a so-called differential file (differential program), which can realize the aforementioned functions in combination with a program already recorded in the computer system.

While preferred example embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

Some or all of the above example embodiments may also be described as, but not limited to, the following Supplementary Notes.

(Supplementary Note 1)

An information processing device provided with:
an acquisition means that acquires a first position indicating a physical position of a first communication device, a second position indicating a physical position of a second communication device, and third positions indicating a plurality of physical positions set in a path connecting the first position and the second position; and a search means that searches for a physical path corresponding to a communication path of the first communication device and the second communication device based on the first position, the second position, and the plurality of third positions.

(Supplementary Note 2)

The information processing device according to Supplementary Note 1, wherein the search means searches for the physical path passing through the plurality of third positions based on a constraint condition indicating a limit on a physical search range set based on the first position and the second position.

(Supplementary Note 3)

The information processing device according to Supplementary Note 2, wherein the search means sequentially searches for the plurality of third positions in the physical search range with the first position as a basis; calculates a remaining distance by subtracting a physical path distance, which is the sum of straight-line distances between each position from the first position to the last searched third position via the plurality of third positions already searched, from a communication path distance, which is calculated based on a response time of communication between the first communication device and the second communication device and the medium velocity of the communication path; and repeats a process of re-searching for the third position with reference to the last searched branch point among the third positions when the remaining distance is less than a failure condition indicating a minimum value of the remaining distance indicating that the physical path distance is longer than the communication path distance.

(Supplementary Note 4)

The information processing device according to Supplementary Note 3, wherein the search means outputs a path from the first position to the plurality of third positions already searched, the last searched third position and the second position as the physical path when the ratio of the difference between the communication path distance and the physical path distance to the communication path distance and the last searched third position satisfy a predetermined success condition.

(Supplementary Note 5)

The information processing device according to any one of Supplementary Note 1 to Supplementary Note 4, wherein the search means estimates an estimated range of a fourth position in the vicinity of the physical path connecting the first position and the second position, based on a branch point in the physical path estimated based on a first estimated distance from the first position to the fourth position, a second estimated distance from the second position to the fourth position, and a third estimated distance from the first position to the second position, and a fourth estimated distance from the branch point to the fourth position, estimated based on the branch point, the first estimated distance, the second estimated distance, and the third estimated distance.

(Supplementary Note 6)

The information processing device according to Supplementary Note 1, provided with a calculation unit that calculates a medium velocity, which indicates the communication velocity of the medium comprising the communication path, based on the physical path and a response time of the communication between the first communication device and the second communication device connected by a communication path corresponding to the physical path.

(Supplementary Note 7)

The information processing device according to any one of Supplementary Note 1 to Supplementary Note 6, wherein the physical path is a path passing through the third positions of which at least a portion are set on a road.

(Supplementary Note 8)

The information processing device according to any one of Supplementary Note 1 to Supplementary Note 6, wherein the physical path is a path passing through the third positions of which at least a portion indicate spatial coordinates corresponding to a position set on a submarine cable.

(Supplementary Note 9)

The information processing device according to any one of Supplementary Note 1 to Supplementary Note 6, wherein the physical path is a path passing through the third positions of which at least a portion indicate spatial coordinates corresponding to positions set between opposing wireless communication devices.

(Supplementary Note 10)

The information processing device according to Supplementary Note 9, wherein the wireless communication device is an artificial satellite.

(Supplementary Note 11)

An information processing method comprising:

acquiring a first position indicating a physical position of a first communication device, a second position indicating a physical position of a second communication device, and a plurality of third positions indicating physical positions set in a path connecting the first position and the second position; and searching for a physical path corresponding to a communication path of the first communication device and the second communication device based on the first position, the second position, and the plurality of third positions.

(Supplementary Note 12)

A non-transitory computer-readable storage medium storing a program that causes a computer of an information processing device to function as an acquisition means that acquires a first position indicating a physical position of a first communication device, a second position indicating a physical position of a second communication device, and a plurality of third positions indicating physical positions set in a path connecting the first position and the second position; and a search means that searches for a physical path corresponding to a communication path of the first communication device and the second communication device based on the first position, the second position, and the plurality of third positions.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information processing device comprising:
at least one memory storing instructions; and
at least one processor executing the instructions to:
acquire a first position indicating a physical position of a first communication device, a second position indicating a physical position of a second communication device, and a plurality of third positions indicating physical positions set in a path connecting the first position and the second position; and
search for a physical path corresponding to a communication path of the first communication device and the second communication device based on the first position, the second position, and the plurality of third positions,
wherein the searching comprises:
searching for the physical path passing through the plurality of third positions based on a constraint condition indicating a limit on a physical search range set based on the first position and the second position;
sequentially searching for the plurality of third positions in the physical search range with the first position as a basis;
calculating a remaining distance by subtracting a physical path distance, which is the sum of straight-line distances between each position from the first position to the last searched third position via the plurality of third positions already searched, from a communication path distance, which is calculated based on a response time of communication between the first communication device and the second communication device and the medium velocity of the communication path; and
repeating a process of re-searching for the third position with reference to the last searched branch point among the third positions when the remaining distance is less than a failure condition indicating a minimum value of the remaining distance indicating that the physical path distance is longer than the communication path distance.

2. The information processing device according to claim 1, wherein the searching comprises outputting a path from the first position to the plurality of third positions already searched, the last searched third position and the second position as the physical path when the ratio of the difference between the communication path distance and the physical path distance to the communication path distance and the last searched third position satisfy a predetermined success condition.

3. The information processing device according to claim 1, wherein the searching comprises estimating an estimated range of a fourth position in the vicinity of the physical path connecting the first position and the second position, based on a branch point in the physical path estimated based on a first estimated distance from the first position to the fourth position, a second estimated distance from the second position to the fourth position, and a third estimated distance from the first position to the second position, and a fourth estimated distance from the branch point to the fourth position, estimated based on the branch point, the first estimated distance, the second estimated distance, and the third estimated distance.

4. The information processing device according to claim 1, wherein the at least one processor further executes the instruction to calculate a medium velocity, which indicates the communication velocity of the medium comprising the communication path, based on the physical path and a response time of the communication between the first communication device and the second communication device connected by a communication path corresponding to the physical path.

5. The information processing device according to claim 1, wherein the physical path is a path passing through the third positions of which at least a portion are set on a road.

6. The information processing device according to claim 1, wherein the physical path is a path passing through the third positions of which at least a portion indicate spatial coordinates corresponding to positions set on a submarine cable.

7. An information processing method performed by a computer and comprising:
acquiring a first position indicating a physical position of a first communication device, a second position indicating a physical position of a second communication device, and a plurality of third positions indicating physical positions set in a path connecting the first position and the second position; and
searching for a physical path corresponding to a communication path of the first communication device and the second communication device based on the first position, the second position, and the plurality of third positions,
wherein the searching comprises:
searching for the physical path passing through the plurality of third positions based on a constraint condition indicating a limit on a physical search range set based on the first position and the second position;
sequentially searching for the plurality of third positions in the physical search range with the first position as a basis;
calculating a remaining distance by subtracting a physical path distance, which is the sum of straight-line distances between each position from the first position to the last searched third position via the plurality of third positions already searched, from a communication path distance, which is calculated based on a response time of communication between the first communication device and the second communication device and the medium velocity of the communication path; and
repeating a process of re-searching for the third position with reference to the last searched branch point among the third positions when the remaining distance is less than a failure condition indicating a minimum value of the remaining distance indicating that the physical path distance is longer than the communication path distance.

8. The information processing method according to claim 7, wherein the searching comprises outputting a path from the first position to the plurality of third positions already searched, the last searched third position and the second position as the physical path when the ratio of the difference between the communication path distance and the physical path distance to the communication path distance and the last searched third position satisfy a predetermined success condition.

9. The information processing method according to claim 7, wherein the searching comprises estimating an estimated range of a fourth position in the vicinity of the physical path connecting the first position and the second position, based on a branch point in the physical path estimated based on a first estimated distance from the first position to the fourth position, a second estimated distance from the second position to the fourth position, and a third estimated distance from the first position to the second position, and a fourth estimated distance from the branch point to the fourth position, estimated based on the branch point, the first estimated distance, the second estimated distance, and the third estimated distance.

10. The information processing method according to claim 7, further comprising calculating a medium velocity, which indicates the communication velocity of the medium comprising the communication path, based on the physical path and a response time of the communication between the first communication device and the second communication device connected by a communication path corresponding to the physical path.

11. A non-transitory computer-readable storage medium storing a program that causes a computer of an information processing device to execute:
  acquiring a first position indicating a physical position of a first communication device, a second position indicating a physical position of a second communication device, and a plurality of third positions indicating physical positions set in a path connecting the first position and the second position; and
  searching for a physical path corresponding to a communication path of the first communication device and the second communication device based on the first position, the second position, and the plurality of third positions,
  wherein the searching comprises:
    searching for the physical path passing through the plurality of third positions based on a constraint condition indicating a limit on a physical search range set based on the first position and the second position;
    sequentially searching for the plurality of third positions in the physical search range with the first position as a basis;
    calculating a remaining distance by subtracting a physical path distance, which is the sum of straight-line distances between each position from the first position to the last searched third position via the plurality of third positions already searched, from a communication path distance, which is calculated based on a response time of communication between the first communication device and the second communication device and the medium velocity of the communication path; and
    repeating a process of re-searching for the third position with reference to the last searched branch point among the third positions when the remaining distance is less than a failure condition indicating a minimum value of the remaining distance indicating that the physical path distance is longer than the communication path distance.

12. The non-transitory computer-readable storage medium according to claim 11, wherein the searching comprises outputting a path from the first position to the plurality of third positions already searched, the last searched third position and the second position as the physical path when the ratio of the difference between the communication path distance and the physical path distance to the communication path distance and the last searched third position satisfy a predetermined success condition.

13. The non-transitory computer-readable storage medium according to claim 11, wherein the searching comprises estimating an estimated range of a fourth position in the vicinity of the physical path connecting the first position and the second position, based on a branch point in the physical path estimated based on a first estimated distance from the first position to the fourth position, a second estimated distance from the second position to the fourth position, and a third estimated distance from the first position to the second position, and a fourth estimated distance from the branch point to the fourth position, estimated based on the branch point, the first estimated distance, the second estimated distance, and the third estimated distance.

14. The non-transitory computer-readable storage medium according to claim 11, wherein the program causes the computer of the information processing device to execute further calculating a medium velocity, which indicates the communication velocity of the medium comprising the communication path, based on the physical path and a response time of the communication between the first communication device and the second communication device connected by a communication path corresponding to the physical path.

\* \* \* \* \*